United States Patent [19]

Shibasaki

[11] Patent Number: 4,648,207
[45] Date of Patent: Mar. 10, 1987

[54] GLASS RUN FOR AUTOMOBILE DOOR
[75] Inventor: Jun Shibasaki, Ichinomiya, Japan
[73] Assignee: Toyoda Gosei Co., Ltd., Nishikasugai, Japan
[21] Appl. No.: 778,264
[22] Filed: Sep. 20, 1985
[30] Foreign Application Priority Data Sep. 21, 1984 [JP] Japan ............................ 59-143948[U]

[51] Int. Cl.⁴ .................................................. E06B 7/16
[52] U.S. Cl. ........................................... 49/441; 49/489
[58] Field of Search ................. 49/441, 375, 374, 489, 49/488, 440

[56] References Cited

U.S. PATENT DOCUMENTS 3,918,206 11/1975 Dochnahl .............................. 49/441

FOREIGN PATENT DOCUMENTS 316489 8/1929 United Kingdom ................... 49/440

Primary Examiner—Philip C. Kannan
Attorney, Agent, or Firm—Cushman, Darby & Cushman

[57] ABSTRACT

A glass run for an automobile door, which allows in a state fitted in a run channel an internal lateral wall, a bottom wall, and an external lateral wall thereof to form a glass receiving groove of a cross section roughly in the shape of three sides of a rectangle and has seal parts formed respectively on the internal lateral wall and the external lateral wall and adapted to come into contact with the inner and outer surfaces of a glass.

The seal part formed on the internal lateral wall is provided with a curved part projected from the internal lateral wall toward the interior of the glass receiving groove so as to urge the glass toward the exterior of the automobile. The seal part on the external lateral wall is formed of a part extended substantially linearly from the external lateral wall so as to avoid urging the glass toward the interior of the automobile. A bending notch is formed along the joint between the external lateral wall and the bottom wall in such a manner that the stepped edge on the inner base of the external lateral wall is opposed across a narrow gap to the upper surface of the bottom wall. In another embodiment, a support lip is formed so as to project from the external lateral wall or the bottom wall to the other wall along the edge of the aforementioned bending notch. Owing to the construction described above, the distance between the outer surface of the glass and the outer surface of the door frame is small and the possibility of the external lateral wall being caved in is precluded.

8 Claims, 9 Drawing Figures

4,648,207

GLASS RUN FOR AUTOMOBILE DOOR

BACKGROUND OF THE INVENTION

This invention relates to a glass run for an automobile door, and more particularly to a glass run for an automobile door, which glass run in a state fitted in a run channel allows an internal lateral wall, a bottom wall, and an external lateral wall thereof to form a glass receiving groove of a cross section roughly in the shape of three sides of a rectangle and has seal parts formed one each on the aforementioned internal lateral wall and external lateral wall and adapted to slide in contact with the inner surface and outer surface of the glass.

The conventional door glass run has typically possessed of a cross section illustrated in FIG. 1. The door glass run in a state fitted in a glass run channel 1 allows an internal lateral wall 2, a bottom wall 3, and an external lateral wall 5 thereof to form a glass receiving groove 6 of a cross section roughly in the shape of three sides of a rectangle. On the internal lateral wall 2 and the external lateral wall 5 are respectively formed seal lips (seal parts) 8, 9 which are provided with curved parts protruding into the glass receiving groove 6 so as to urge the glass toward the exterior and the interior of the automobile. The surfaces of the seal lips 8, 9 and the bottom wall 3 are generally coated with a urethane type coating material or electrostatically flocked for reduction of sliding resistance. The glass run is produced by extrusion molding such rubbery material as CR or EPDM or such elastic plastic material as PVC or polyolefin. On the outer sides of the bases of the internal lateral wall 2 and the external lateral wall 5 are respectively formed engaging protuberances 2a, 5a adopted for engagement with the opposite slipproof grooves 13, 14 of the run channel 1. Normally by the extrusion molding, the opposite lateral walls 2, 5 are produced in a mutually diverging state (with an angle of inclination of 25° to 45°). For the opposite lateral walls 2, 5 to be easily bent inwardly during their insertion into the run channel 1, bending notches 15, 16 are formed at the opposite sides of the bottom wall 3.

In the glass run of the type described above, since the seal lip 9 on the external lateral wall urges the glass 11 toward the interior of the automobile notwithstanding the seal lip 8 on the internal lateral wall urges the glass 11 toward the exterior of the automobile, the distance l between the outer surface of the glass and the outer surface of the door frame 12 tends to increase. The growth of this distance is undesirable from the standpoint of abating the noise of wind generated on the glass and enhancing the attractiveness of design. In the circumstances, the desirability of developing a glass run so constructed as to decrease this distance l to the fullest extent is finding recognition.

SUMMARY OF THE INVENTION

This invention relates to a glass run for an automobile door, which in a state fitted in a run channel allows an internal lateral wall, a bottom wall, and an external wall thereof to form a glass receiving groove of a cross section roughly in the shape of three sides of a rectangle and has seal parts formed on the aforementioned internal lateral wall and external lateral wall and adapted to come into contact with the inner surface and outer surface of the glass. In this glass run for the automobile door, the seal part formed on the internal lateral wall is provided with a curved part protruding from the internal lateral wall toward the interior of the glass receiving groove so as to urge the glass toward the exterior of the automobile and the seal part formed on the external lateral wall is formed of a part extended substantially linearly from the external lateral wall so as to avoid urging the glass toward the interior of the automobile. The bending notch formed along the joint of the external lateral wall and the bottom wall has a shape such that the stepped edge at the base of the internal lateral wall is opposed across a narrow gap to the upper surface of the bottom wall or a shape such that a support lip is extended along the edge of the bending notch from either the external lateral wall or the bottom wall to the other wall.

This invention aims to provide a glass run for an automobile door which manifests the following effect owing to the construction thereof described above.

The distance between the outer surface of the glass and the outer surface of the door frame is notably small as compared with that found in the conventional glass run and, as the result, the noise of wind generated on the glass is decreased and the attractiveness of design is improved. Moreover, the possibility of the external lateral wall caving in can be fully precluded.

BRIEF DESCRIPTION OF THE DRAWINGS

FIG. 3 is a cross section illustrating the action of the glass run of FIG. 2 manifested in preventing the external lateral wall thereof from caving in.

FIG. 5 is an explanatory diagram illustrating the action manifested by the glass run as the first embodiment when it lacks a structure for preventing the phenomenon of cave-in.

DESCRIPTION OF THE PREFERRED EMBODIMENT

Figure 1:
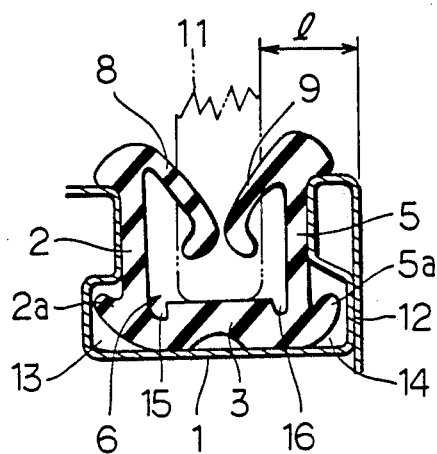
FIG. 1 is a cross section illustrating the manner in which the conventional glass run is set in place.
Figure 2:
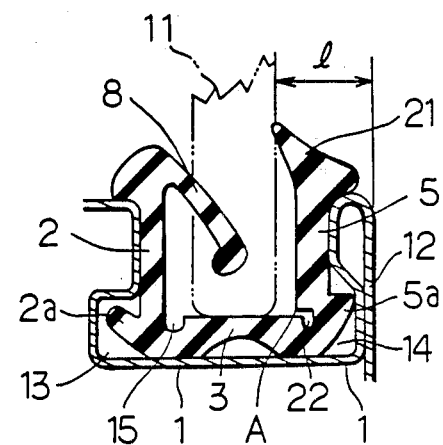
FIG. 2 is a cross section illustrating the manner in which a glass run as the first embodiment of this invention is set in place in a run channel.

Now, the present invention will be described below with reference to the accompanying drawings illustrating various embodiments of this invention. In FIGS. 2–9, the reference symbols which have equivalents in FIG. 1 denote identical components. Explanations on these components will be omitted to avoid useless repetition.

(1) First embodiment (FIGS. 2–4):

The seal lip (seal part) 8 on the internal lateral wall 2 is provided with a curved part of the form of a cantilever similarly to the conventional countertype and, therefore, enabled to urge the glass 11 toward the exterior of the automobile. The seal part 21 on the external lateral wall 5 is formed of a part extended substantially linearly in the form of a lip from the external lateral wall 5 and, therefore, scarcely allowed to urge the glass 11 toward the interior of the automobile. Further, inside the joint between the external lateral wall 5 and the bottom wall 3, a notch 22 is formed on the bottom wall 3 side of the portion receding the inner surface of the external lateral wall 5. The stepped edge A at the inner base of the external lateral wall 5 is opposed across a narrow gap to the upper surface of the bottom wall 3.

Figure 4:
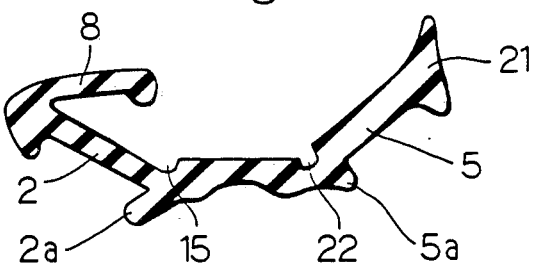
FIG. 4 is a cross section illustrating the manner in which the glass run as the first embodiment of this invention is obtained by extrusion molding.

FIG. 4 represents a cross section in which the glass run of this embodiment is obtained by extrusion molding.

The operation of this embodiment is as follows.

This embodiment has a construction such that the seal part 8 of the internal lateral wall 2 urges the glass 11 toward the exterior of the automobile and the seal part 21 of the external lateral wall 5 refrains from urging the glass toward the interior of the automobile. As the result, the distance between the outer surface of the glass 11 and the outer surface of the door frame is decisively small as compared with the distance found in the conventional countertype.

Figure 3:
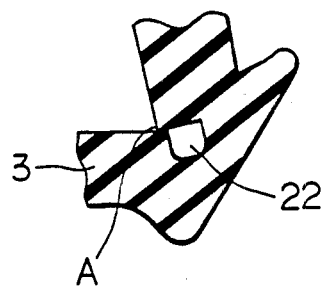
Figure 5:
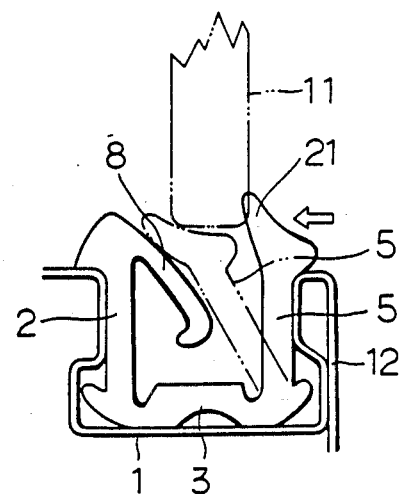
Figure 6:
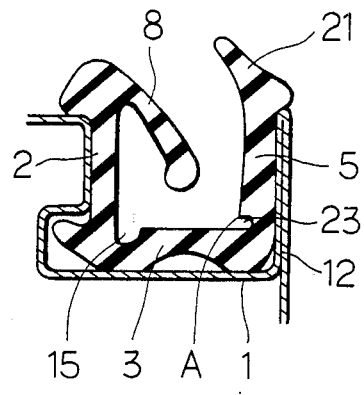
FIG. 6 is a cross section illustrating the manner in which the glass run as the second embodiment of this invention is set in place in a run channel.
Figure 7:
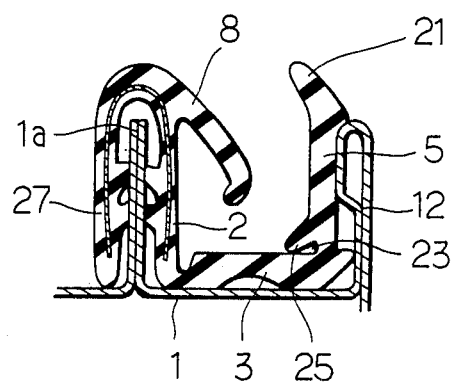
FIG. 7 is a cross section illustrating the manner in which the glass run as the third embodiment of this invention is set in place.
Figure 8:
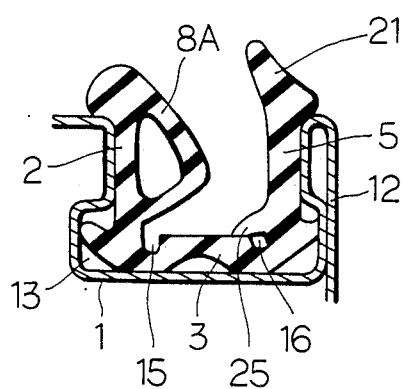
FIG. 8 is a cross section illustrating the manner in which the glass run as the fourth embodiment of this invention is set in place.
Figure 9:
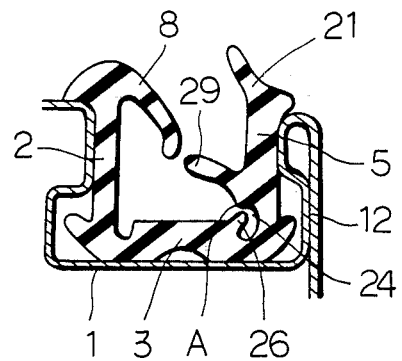
FIG. 9 is a cross section illustrating the manner in which the glass run as the fifth embodiment of this invention is set in place.

Here, since the seal part 21 on the external lateral wall is formed of a part extended substantially linearly from the external lateral wall 5 as illustrated in FIG. 5, the volume of the seal part 21 which extrudes from the edge of the door frame 12 is large. When this seal part is exposed to the external force exerted in the direction of a white arrow or when the leading end of the seal part is rolled in the edge surface of the glass 11, there is the possibility that the external lateral wall 21 will cave in toward the interior as illustrated in FIG. 5. In actuality, however, this possibility is precluded because the joint between the external lateral wall 5 and the bottom wall 3 is so constructed as to prevent the external lateral wall 5 from caving in, i.e. because the stepped edge A at the inner base of the external lateral wall and the bottom wall 3 interfere with each other as illustrated in FIG. 3.

(2) Second embodiment (FIG. 6):

Unlike the first embodiment, the second embodiment has a notch 23 inside the joint between the external lateral wall 5 and the bottom wall 3 depressed along the upper surface of the bottom wall 3 into the external lateral wall 5. Here, the upper end edge of the notch 23 constitutes itself the stepped edge A on the inner base of the internal lateral wall. In this embodiment, the slip-proof groove on the external side of the run channel 1 and the corresponding engaging protuberance on the external side of the external lateral wall 5 are eliminated.

This embodiment brings about the same operation and effect as described above. In this embodiment, the peripheral portion of the door frame 12 is not required to be swelled out toward the interior of the automobile and the distance between the outer surface of the glass and the outer surface of the door frame can be decreased further.

(3) Third embodiment (FIG. 7):

Unlike the second embodiment, this embodiment has a support lip 25 projected from the upper edge of the notch 23 (the edge of the notch) toward the bottom wall 3 for the purpose of enhancing the effect of preventing the external lateral wall 5 from caving in. Further in this embodiment, fast retention of the internal lateral wall 2 is attained by causing a U-shaped nipping part 27 sharing one of the legs of the letter U with the internal lateral wall 2 to be joined with a flange part 1a formed in the run channel 1. This construction contributes to enhancing the ease of the fixation of the glass run to the run channel.

(4) Fourth embodiment (FIG. 8):

Unlike the third embodiment, this embodiment has a notch 16 depressed into the bottom wall 3 side similarly to the conventional countertype. Further, in this embodiment, a seal part 8A on the internal lateral wall 2 is in the form of a ring.

This embodiment brings about the same operation and effect as those of the third embodiment. The seal part 8A on the internal lateral wall urges the glass more powerfully and prevents the glass from play effectively.

(5) Fifth embodiment (FIG. 9):

Unlike the first embodiment, this embodiment has a large notch 24 formed along the joint between the external lateral wall and the bottom wall and, at the same time, a support lip 26 projected from the bottom wall 3 side of the edge of the notch and opposed to the notch surface of the external lateral wall 5. Further in this embodiment, a glass edge sliding lip 29 is projected from the external lateral wall for the purpose of enhancing the glass sealing property.

The action manifested by this embodiment in the prevention of the external lateral wall 5 from caving in is similar to that obtained in the third and fourth embodiments.

What is claimed is:

1. A glass run for an automobile door, which comprises in combination:
   (a) a glass receiving groove formed, when said glass run is fitted into a run channel, with an internal lateral wall, a bottom wall, and an external lateral wall in a manner acquiring a cross section roughly in the shape of three sides of a rectangle,
   (b) seal parts formed respectively on said internal lateral wall and external lateral wall and adapted to come into contact with the inner and outer surfaces of a glass,
   (c) a curved part projected from said internal lateral wall toward the interior of said glass receiving groove so as to urge said glass toward the exterior of the automobile,
   (d) a seal part formed of a part extended substantially linearly from said external lateral wall so as to avoid urging said glass toward the interior of the automobile, and
   (e) a bending notch formed along the joint between said external lateral wall and said bottom wall in such a manner that a stepped edge on the inner base of said external lateral wall is opposed across a narrow gap to the upper surface of said bottom wall.

2. A glass run for an automobile door according to claim 1, wherein said bending notch is formed on said bottom wall at a position receding from the inner surface of said external lateral wall.

3. A glass run for an automobile door according to claim 1, wherein said seal part on the internal lateral wall is in the form of a ring.

4. A glass run for an automobile door according to claim 1, wherein said bending notch is formed along the upper surface of said bottom wall and depressed into said external lateral wall.

5. A glass run for an automobile door according to claim 4, which further comprises a support lip projected from the upper edge of said bending notch toward said bottom wall.

6. A glass run for an automobile door, which comprises in combination:
   (a) a glass receiving groove formed, when said glass run is fitted into a run channel, with an internal lateral wall, a bottom wall, and an external lateral wall in a manner acquiring a cross section roughly in the shape of three sides of a rectangle,
   (b) seal parts formed respectively on said internal lateral wall and external lateral wall and adapted to come into contact with the inner and outer surfaces of a glass,
   (c) a curved part projected from said internal lateral wall toward the interior of said glass receiving groove so as to urge said glass toward the exterior of the automobile,
   (d) a seal part formed of a part extended substantially linearly from said external lateral wall so as to avoid urging said glass toward the interior of the automobile, and
   (e) a support lip formed along the joint between said external lateral wall and said bottom wall and directed from one of said external lateral and bottom walls to the other wall along the edge of a bending notch formed between said external and bottom walls.

7. A glass run for an automobile door according to claim 6, wherein said support lip is projected from the upper edge of said notch to said bottom wall.

8. A glass run for an automobile door according to claim 7, wherein said support lip is projected from the bottom wall side of the edge of said notch to the notch face of said external lateral wall.

* * * * *